United States Patent
Knepple et al.

(10) Patent No.: US 8,203,231 B2
(45) Date of Patent: Jun. 19, 2012

(54) METHOD FOR MAKING POWER AVAILABLE AND POWER SUPPLY UNIT THEREFOR

(75) Inventors: Ronny Knepple, Uberlingen (DE);
Benno Petersen, Herdwangen (DE);
Bernd Speth, Uberlingen (DE)

(73) Assignee: Diehl Aerospace GmbH, Uberlingen (DE)

( * ) Notice: Subject to any disclaimer, the term of this patent is extended or adjusted under 35 U.S.C. 154(b) by 72 days.

(21) Appl. No.: 12/730,518

(22) Filed: Mar. 24, 2010

(65) Prior Publication Data
US 2010/0225163 A1    Sep. 9, 2010

Related U.S. Application Data

(63) Continuation of application No. PCT/EP2008/007386, filed on Sep. 10, 2008.

(30) Foreign Application Priority Data

Oct. 2, 2007 (DE) .......................... 10 2007 047 260
Nov. 14, 2007 (DE) .......................... 10 2007 054 291

(51) Int. Cl.
*B60L 1/00* (2006.01)
(52) U.S. Cl. ............................................... 307/9.1
(58) Field of Classification Search ............... 307/9.1
See application file for complete search history.

(56) References Cited

U.S. PATENT DOCUMENTS

| 5,106,035 A * | 4/1992 | Langford, III ................. 244/59 |
| 2004/0226309 A1* | 11/2004 | Broussard ....................... 62/236 |
| 2007/0289976 A1* | 12/2007 | Meyer et al. ............. 220/592.09 |

FOREIGN PATENT DOCUMENTS

| DE | 10 2005 010 399 A1 | 9/2006 |
| EP | 0 957 026 A2 | 11/1999 |
| EP | 1481838 A2 | 5/2004 |
| WO | 2006/058774 A2 | 6/2006 |

* cited by examiner

*Primary Examiner* — Rexford N Barnie
*Assistant Examiner* — Dru Parries
(74) *Attorney, Agent, or Firm* — Scully, Scott, Murphy & Presser, P.C.

(57) ABSTRACT

In order to relieve the power supply system of commercial aircraft of one absolutely essential load, specifically a galley with heating and cooling appliances, the appliances are provided with at least one autonomous power supply device which can be handled without any problems and is installed in a galley trolley (1) of standardized dimensions, preferably with a fuel cell (2) together with its fuel tanks (3, 4) and voltage converters (5) in order to be replaced at the same time by catering lifting loaders in the course of galley supply and disposal. Instead of or in addition thereto, an autonomous, mobile power supply unit such as this can also be installed in one of the standardized baggage or cargo containers for accommodation in the cargo bay of the aircraft, and then in particular also to feed electrical heating and cooling appliances in other containers.

8 Claims, 1 Drawing Sheet

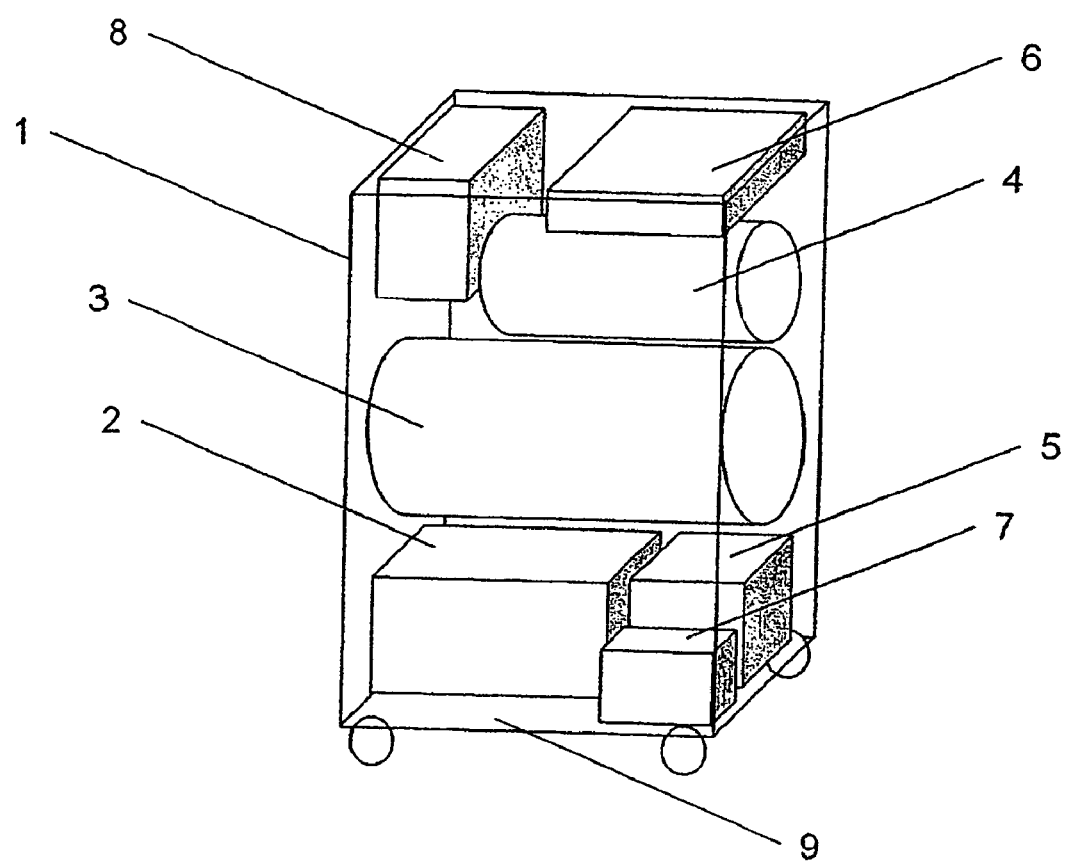

METHOD FOR MAKING POWER AVAILABLE AND POWER SUPPLY UNIT THEREFOR

CROSS REFERENCE TO RELATED APPLICATIONS

This application is a continuation of PCT Appln. No. PCT/EP2008/007386, filed Sep. 10, 2008, and claims priority over the International Convention of German Appln. Nos. BRD 102007047260.0, filed Oct. 2, 2007 and BRD 102007054291.9, filed Nov. 14, 2007.

BACKGROUND OF THE INVENTION

1. Field of the Invention

The invention relates to a method for providing power in a commercial aircraft, and to a device for providing the power to the aircraft.

2. Discussion of the Prior Art

Measures such as these are described in DE 10 2005 054 883 A1 for power supply units with fuel cells. These are used there for recharging electrical and water stores in movable automatic drinks dispensers for use in the cabin of a passenger aircraft. During the course of recharging the electrical rechargeable battery in the automatic drinks dispenser in order to allow it to be operated, the hot water which is created as a reaction product in the fuel cell is passed to the automatic drinks dispenser in order to dispense or brew drinks. A plurality of such power supply units are installed in different areas of the aircraft, in particular in the forward and aft galleys and in the center area of the passenger cabin in order to be moved there for replenishment of the automatic drinks dispensers, in the course of providing the passenger services. However, the replenishment of the fuels for the fuel cells which are installed in a distributed form throughout the cabin is itself problematic since this is highly labor intensive and, in particular, is safety-critical because of the liquid hydrogen. This must be carried out in parallel with cabin cleaning by specialist personnel who are specialized in this field, after the aircraft has landed. For this reason, it has until now been impossible to actually use fuel cells in air transport.

SUMMARY OF THE INVENTION

With knowledge of these circumstances, the present invention is based on the technical problem of making it possible to use a power supply unit such as this with little operational and maintenance effort, and at the same time functionally more safely and universally.

This object is achieved by the major features specified in the claims, wherein accordingly, the power supply unit is no longer installed in a fixed position in the cabin with its so-called generator here, specifically a rechargeable battery or preferably a fuel cell together with the tanks for its fuels, but is designed to be movable as a replaceable unit, in a modular form, with its own power supply and completely functionally; specifically installed in a container in the form of one of the standardized galley trolleys for the galley or in the form of the baggage and cargo containers, which are standardized for different aircraft models, for accommodation in the cargo bay of an aircraft. In the same way as those movable containers, these power supply units are easily released, after landing, from their dock in their accommodation bay, and are moved to the outside. When power supply units such as these are used, they can they be collected externally and can be replenished without any time constraints in a specific operation—which is particularly suitable for handling of hydrogen for operation of fuel cells. During this process, units which have already been replenished are delivered from a supply area to the aircraft where they are moved into the galley or into the cargo bay on-board the aircraft by conventional handling for trolleys and containers. Docking interfaces of the power supply unit are connected to a local load network by the fresh power supply unit being locked in its accommodation position.

The inventive solution has the particular advantage that the existing infrastructure, specifically the catering supply chain with its hydraulic lifting loaders for supplying and disposal from galleys and the movable conveyor belts for loading and unloading the cargo bays, can also be used for handling purposes for replacement of the power supply units. There is therefore no need to install any additional logistics with the associated safety-relevant problems of taxiway access.

A specific one of the narrow food trolley docking bays in the galley, or a specific one of fixed stowage spaces in the cargo bay is designed and reserved for the connection of the standardized power supply unit. In this case, the electrical wiring there is accessible for the mobile interface, with latching during the docking process, in particular for supplying the electrical loads in the galley or at other locations in the cabin, which are preferably adjacent to the galley, in order to minimize the wiring complexity. These loads are then fed from the mobile autonomous power supply unit, significantly reducing the load on the on-board power supply system that is connected to an engine generator.

According to one development of the invention, it is also possible for emergency power supply loads to be connected to the replaceable power supply unit as required, with its non-essential loads then expediently being disconnected, replacing a normal emergency power supply. The operational readiness of this autonomous emergency power supply is tested during previous normal operation and therefore need not first of all be started up, but rather is immediately available. This ensures particular redundancy when, in the event of an emergency, the power supply units which operate independently of one another for the various galleys and/or cargo containers are interconnected to the emergency power supply system.

Particularly for long-haul flights, a supply of such power supply units that have been fitted ready for operation can be stowed in a space-saving manner above or below the galley until they are needed to replace a unit that has been used up, making use of an internal lift, or can also be carried aft of the galley, instead of the first seat row.

At the destination airport and/or during stopovers during long-haul flights, power supply units to the same handling standard can be replaced by those with freshly charged generators (fuel cells or rechargeable batteries) during the course of replacement of the galley trolleys and/or the unloading of baggage or freight containers.

Central replenishment of the mobile power supply units which have been removed from the aircraft after landing and is carried out remotely from the aircraft refueling, that is to say separated physically and in time from the normal aircraft maintenance and thus at the same time allowing safety and costs to be optimized, ensures a very high degree of safety and requires fewer specialist personnel than decentralized equipment maintenance in each of the aircraft which are currently on the ground.

Since the supply of loads from the replaceable power supply unit is restricted, in the interest of short wiring runs, to the immediate vicinity of the docking station in which the power trolley according to the invention is secured by means of toggles in the same way as other galley trolleys, the solution according to the invention also opens up greater freedom for the configuration of large passenger cabins, in particular with regard to the location of the central galley. Since the galley together with the replaceable power supply unit operates essentially autonomously, only minor modifications are required to the on-board wiring when the intention is to move a galley such as this in the course of one of the reconfiguration processes that occur frequently, for example in order to temporarily enlarge a specific cabin area by a number of seat rows. The individual seat illumination is expediently also supplied from the replaceable power supply units in the stationary forward and aft galleys in order to minimize modifications to the wiring resulting from movement of the central galley, whose power supply unit then essentially feeds only its own loads for this galley, and possibly seat space convenience devices in the immediate vicinity.

When fuel cell generators are used, the reaction water which may be temporarily stored in the power supply unit can be disposed of at the same time in the course of replenishment of the fuel in cryogenic liquid tanks—if it has not previously been pumped into a cabin tank, even before removal of the power supply unit from the aircraft fuselage, in order to provide additional non-drinking water for the washroom or, after processing, for food preparation.

The solution according to the invention also allows individual optimization of a power supply which is no longer provided via the on-board power supply system. It is therefore possible to recharge the power supply unit for short-haul flights with smaller fuel tanks, or fuel tanks that have been filled to a lesser extent, for a fuel cell or with fewer rechargeable-battery cells, because there is no need to offer hot meals and the weight reduction that this results in reduces the aircraft fuel consumption.

BRIEF DESCRIPTION OF THE DRAWINGS

In order to illustrate this in more detail, the single FIGURE of the drawing shows a mobile replaceable power supply unit, designed according to the invention, as a trolley with the standardized dimensions of a galley trolley (galley carts) for the galley docking stations (accommodation bays), equipped in the preferred manner with a fuel cell generator, with the sketch being simplified to the essential functions, and not to scale.

A movable container, in this case shown as a trolley 1, is designed for accommodation in one of the narrow bays in the galley—such as a conventional galley trolley with food supplies or with waste to be disposed of after the flight—but now fitted with a fuel cell system comprising at least one fuel cell or generator cell 2, and with tanks for its fuel supplies. In particular, the latter have a liquid-hydrogen tank 3, and a liquid-oxygen tank 4 with a comparatively small volume. The electrical power supplied from the cell 2 is converted to the rated voltage in a converter 5.

Power for starting up and shutting down the cell 2 and for operation of a control and monitoring unit 6 which is used in particular to ensure operation of the fuel cell system is stored in an electrical store 7 which can be replaced or recharged in the course of fuel replenishment.

The electrical power generated by the cell 2 is fed under the influence of the control and monitoring unit 6 and via a docking interface 8 into the load network in the vicinity of the docking station which accommodates the trolley 1 such that it can be replaced. The interface 8 contains not only the electrical outputs, in particular such as those for 115 volts AC and 28 volts DC, but also a water supply and junctions for the thermal energy that is created in the fuel cell 2, for example in the form of hot water and steam. The connections are made by latching the trolley 1 in its accommodation bay (docking station) during the course of insertion and locking.

Process components for operation of the cell 2, such as sensors, valves and heat exchangers, are distributed throughout a service area 9 of the trolley 1, which is only indicated symbolically in the sketch.

In the case of a trolley 1 which is designed as a galley container, the loads, which are fed from a replaceable, autonomous power supply unit such as this are, in particular, the heating and cooling appliances for the foods and drinks that are kept in the galley, as well as the galley lighting.

When a standardized baggage or cargo container is fitted with a fuel cell system such as this, which can be designed to be appropriately larger, in order to reduce the load on the on-board power supply system while any heating and cooling appliances in other containers which are connected to the power supply system of the aircraft in the cargo bay are supplied from this fuel cell system, and, furthermore, not only loads in the galley but preferably also loads in the cabin equipment, which need not be operated at all, or in any case are not essential, after landing, that is to say during replacement of the fuel cell unit, such as actuating motors for seat and ventilation comfort devices or plug sockets for Notebooks and other working or entertainment equipment.

In principle, within the scope of the present invention, the replaceable power supply unit can also be fitted with a pack of the modern relatively powerful rechargeable batteries instead of with a fuel cell generator, although the weight of such rechargeable batteries is at the moment still somewhat greater than an appropriately equipped fuel cell.

In any case, one absolutely essential load on the on-board power supply in commercial aircraft, specifically the galley with its heating and cooling appliances, is removed from that power supply system if at least one autonomous power supply device, which can be handled without any problems, preferably fitted with a fuel cell together with its fuel tanks and voltage converters, is installed in a galley trolley of standardized dimensions and can also be replaced by means of catering lifting loaders during the course of galley supply and disposal. Instead of or in addition to this, an autonomous, mobile power supply unit such as this can also be installed in one of the standardized baggage or cargo containers for accommodation in the cargo bay of the aircraft, and can then in particular also feed electrical heating and cooling appliances in other containers. A plurality of power supply devices kept available in this way can be operated in an interconnected form for a redundant emergency power supply.

What is claimed is:

1. A method for providing power in a commercial aircraft, comprising:
    manipulating a power supply device, which is in the form of a galley trolley, or in the form of a baggage and/or cargo container to lock the power supply device in a cargo bay of the commercial aircraft, such that the power supply device is permitted to be replaceable; and
    connecting the power supply device to a local load network on-board of the commercial aircraft via docking interfaces to export the energy generated from the power supply device to the local load network, the local load network being external of the power supply device.

2. The power supply unit as claimed in claim 1, wherein the generator comprises at least one of a fuel cell and a rechargeable battery.

3. A power supply device for providing power in a commercial aircraft, comprising:
    a container in the form of a galley trolley or of a baggage or cargo container;

a generator comprising fuel supplies and operating devices; and a local load network on-board the commercial aircraft, which is external of the container, wherein the generator further comprises a converter and docking interfaces for connection to the local load network to export the energy generated by the generator to the local load network.

4. The power supply device as claimed in claim 3, wherein said interfaces are designed to feed heating and/or cooling appliances and lighting devices located in a galley and/or in a cargo bay.

5. The power supply device as claimed in claim 3, wherein said interfaces are designed to enable convenience functions at seat locations in relatively close vicinity to a galley.

6. The power supply device as claimed in claim 3, further comprising tanks containing liquid hydrogen and liquid oxygen, respectively, for operation of said generator.

7. The power supply device as claimed in claim 3, further comprising a store, a control and monitoring unit and, system components for enabling autonomous operation of said generator.

8. The power supply device as claimed in claim 3, wherein the device is connected to at least one additional power supply unit on-board the aircraft, to provide an emergency power supply.

* * * * *